UNITED STATES PATENT OFFICE 2,511,961

BETA-NITROALKYL SULFIDES AND PROCESS FOR THEIR PREPARATION

Carl T. Bahner, Jefferson City, Tenn.

No Drawing. Application October 10, 1946,
Serial No. 702,355

16 Claims. (Cl. 260—609)

My invention relates to beta-nitroalkyl sulfides and a process for preparing them. More particularly it relates to the reaction of nitroolefins with hydrogen sulfide and with mercaptans and to the novel and useful compounds produced thereby.

In accordance with the process of my invention, nitroolefins having the formula

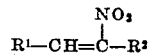

in which $R^1$ is hydrogen, alkyl and aryl, and $R^2$ is hydrogen or alkyl, are mixed with a sulfhydryl compound having the formula $$R^3-SH$$

in which $R^3$ is hydrogen, alkyl, aryl, or aralkyl, and the resulting reaction product is separated in a suitable manner, such as by crystallization or by fractional distillation.

Nitroolefins of the class defined above react with hydrogen sulfide in 2:1 molar ratio to give substituted or unsubstituted bis(beta-nitroalkyl) sulfides having the formula

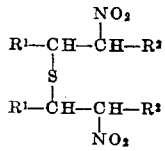

in which the substituent groups are as defined above. When $R^3$ of the sulfhydryl compound is other than hydrogen, the resulting product is the substituted or unsubstituted mono(beta-nitroalkyl) mixed sulfide having the formula

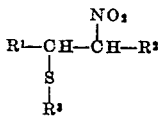

The two types of compounds, symmetrical and unsymmetrical, which can be produced by my process can be represented by the general formula

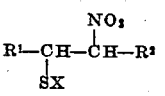

wherein X represents a substituent selected from a class consisting of hydrogen, alkyl, aryl, aralkyl and

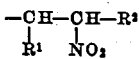

wherein $R^1$ and $R^2$ have their former significancies..

The following compounds will illustrate the class of nitroolefins, defined above, suitable for use in my invention: nitroethene, 2-nitro-1-phenyl-ethene, 2-nitro-1-propene, 2-nitro-1-phenyl-1-propene, 2-nitro-1-(2-naphthyl)-1-propene, 2-nitro-1-butene, 2-nitro-1-phenyl-1-butene, 1-nitro-1-butene, 2-nitro-2-butene, 3-nitro-3-hexene, 2-nitro-6-methyl-1-heptene, and 2-methyl-3-nitro-3-nonene.

Among the sulfhydryl compounds suitable for use in the process of my invention may be cited the following: hydrogen sulfide, methanethiol, 2-propanethiol, 1-butanethiol, 2-butanethiol, 2-methyl-1-propanethiol, 2-methyl-2-propanethiol, 1-hexanethiol, thiophenol, phenylmethanethiol, and 2-naphthalenethiol.

Among the novel products of my invention the following may be cited as illustrations:

Bis(2-nitroethyl) sulfide
Bis(2-nitro-1-phenylethyl) sulfide
Bis(2-nitro-1-(2-naphthyl)ethyl) sulfide
Bis(2-nitropropyl) sulfide
Bis(2-nitro-1-phenylpropyl) sulfide
Bis(2-nitrobutyl) sulfide
Bis(2-nitro-1-phenylbutyl) sulfide
Bis(1-nitro-2-butane) sulfide
Bis(3-nitro-2-butane) sulfide
Bis(4-nitro-3-hexane) sulfide
Bis(6-methyl-2-nitroheptyl) sulfide
Bis(2-methyl-3-nitro-4-nonane) sulfide All of the compounds in the above list may be designated as bis(beta-nitroalkyl) sulfides. The process of my invention is also capable of producing unsymmetrical (beta-nitroalkyl) sulfides, such as the methyl, butyl, octyl, phenyl, beta-naphthyl, and benzyl (beta-nitroalkyl) sulfides, wherein the beta-nitroalkyl group may be illustrated by the groups disclosed in the list of bis(beta-nitroalkyl) sulfides disclosed above.

In one specific embodiment of the process of my invention, I introduce a nitroolefin of the defined class into a suitable reaction vessel equipped with an efficient stirrer and means for cooling the reaction mixture, and introduce hydrogen sulfide therein until absorption of the gas ceases. The resulting thioether is then separated by fractional distillation or by crystallization, depending upon its physical properties.

In another specific embodiment of the process of my invention, I introduce a mercaptan into a suitable reaction vessel and add a nitroolefin of the class defined ordinarily in small portions over a period of time, in order to minimize temperature fluctuations, caused by the exothermic nature of the reaction. The resulting sulfide is then separated by fractional distillation or crystallization.

In another specific embodiment of the process of my invention, I combine a nitroolefin and a sulfhydryl compound of the classes defined in a suitable reaction vessel and add thereto an alkaline catalyst to accelerate the desired reaction.

In still another specific embodiment of the process of my invention, I carry out the reaction as detailed above in the presence of an inert, unreactive solvent, as a means of maintaining the fluidity of the reaction mixture, facilitating the admixture of the reactants, and aiding in heat transfer. The solvent may be removed subsequently by fractional distillation, or the sulfide may be crystallized therefrom, depending on the physical properties of the sulfide and of the solvent.

In carrying out the reaction, I ordinarly prefer to use a catalyst, since I have found that alkaline catalysts produce a marked increase in the rate at which the reaction occurs. Alkaline compounds in general, including inorganic alkaline materials, such as sodium hydroxide and calcium hydroxide, are suitable for catalyzing the reaction; but for various reasons, I have found amines to be preferable, and I have found those amines having dissociation constants within the range of about $10^{-3}$ to $10^{-5}$ to be most effective. Among such amines may be cited methylamine, diethylamine, triethylamine, benzyl-dimethylamine, n-butylamine, 1-methylpropylamine, and diisobutylamine. The proportion of catalyst used is not critical, since the reaction takes place to some extent in the absence of the catalyst; but I ordinarily prefer to use from about 1 to 5%, based on the total weight of reactants and solvent.

Ordinarily, I prefer to carry out the reaction around room temperature or within about 20° C. thereof. At elevated temperatures, for example, at 80 to 100° C., sulfhydryl compounds have a tendency to reduce nitro groups. For this reason, it is preferable to avoid temperatures above this range in carrying out the process of my invention, although I have observed that the process is operative to some degree at temperatures substantially above this range.

Solvents for use in my process should be substantially unreactive toward the nitroolefins, sulfhydryl compounds, and catalysts. Among such solvents are alcohols, ethers, cyclic ethers, aliphatic hydrocarbons, and aromatic hydrocarbons. As specific examples of such groups may be mentioned methanol, ethanol, ethyl ether, butyl ether, 1,4-dioxane, petroleum ether, and benzene.

The following examples will further illustrate my invention:

Example I

The preparation of bis(2-nitrobutyl) sulfide was carried out as follows: Washed and dried hydrogen sulfide from a Kipp generator was passed into a solution of 1030 parts by weight of fresh 2-nitro-1-butene in 1040 parts by weight of 1,4-dioxane containing 5 parts by weight of triethylamine until the absorption of hydrogen sulfide ceased and the color of the solution changed from deep green to orange-red. Heat was evolved during the reaction, so that it was necessary to employ an ice bath most of the time in order to keep the reaction mixture from rising above room temperature. The solvent served to keep the reaction mixture from becoming too viscous, and also increased the volume, thereby making the absorption of the gas more efficient. The reaction product was distilled under vacuum, and 710 parts by weight of a fraction boiling between 160 and 166° C. at about 2 mm. Hg were separated. Upon redistillation, a purified product was obtained, having the following properties: boiling point 139° C. at approximately 1 mm. Hg, specific gravity $(d_4^{25})$ 1.170, index of refraction $(n_D^{25})$ 1.489; analysis: calculated for $C_8H_{16}O_4N_2S$: 40.66% carbon, 6.83% hydrogen; found: 40.67% carbon, 6.60% hydrogen.

Example II

When the reaction as described in Exampe I was carried out at 75 to 80° C. a deposit of yellow solid, apparently sulfur, formed by oxidation of the hydrogen sulfide, appeared on the walls of the reaction vessel. However, the expected bis(2-nitrobutyl) sulfide was formed in good yield.

Example III

Bis(1-nitro-2-butane) sulfide was prepared by the following procedure: A solution of 700 parts by weight of 1-nitro-1-butene in 1340 parts by weight of benzene was saturated with hydrogen sulfide at room temperature. The reaction proceeded quite slowly until 7 parts by weight of triethylamine were added; then the mixture became warm rapidly, and a water bath was employed to keep the temperature down to about 30° C. The addition of hydrogen sulfide was continued for a period of 1.5 hours. The solvent and the catalyst were removed by distillation to a liquid temperature of 50° C. at 30 mm. Hg, and the desired product was separated in nearly theoretical yield by fractional distillation through a Vigreux column. The product had the following properties: boiling point 155° C. at slightly above 1 mm. Hg, specific gravity $(d_4^{25})$ 1.171, index of refraction $(n_D^{25})$ 1.492.

Example IV

The preparation of bis(2-nitro-1-phenylethyl) sulfide was carried out as follows: Three hundred parts by weight of 2-nitro-1-phenylethene were dissolved in 518 parts by weight of 1,4-dioxane at room temperature, 4 parts by weight of diethylamine were added, and hydrogen sulfide was passed into the solution for 1.5 hours. At first, heat evolution was so rapid that a water bath was necessary to prevent excessive temperature rise. The reaction product was washed with 5,000 parts by weight of water; and the resulting semisolid mass was washed with 95% ethanol and then recrystallized from absolute ethanol. The first crop of crystals, amounting to 80 parts by weight, was recrystallized and found to have a melting point of 108° C. Analysis: calculated for $C_{16}H_{16}O_4N_2S$: 57.8% carbon, 4.95% hydrogen; found: 57.66% carbon, 5.13% hydrogen.

Example V

The preparation of butyl 2-nitrobutyl sulfide was carried out as follows: To a mixture of 180 parts by weight of 1-butanethiol with 1 part by weight of triethylamine were added 202 parts by weight of fresh 2-nitro-1-butene in small portions over a period of about one hour, during which time the temperature was maintained at 30° C. On fractional distillation of the reaction product, 62 parts by weight of the desired compound were separated and found to have the following properties: boiling point 82 to 86° C. at about 1 mm.

Hg, specific gravity ($d_4^{25}$) 1.0143, index of refraction ($n_D^{25}$) 1.470.

The above reaction, when carried out in the absence of a catalyst, required three days to go to completion.

The reaction of sodium n-butyl sulfide with an equimolar proportion of 2-nitro-1-butene in alcoholic solution gave butyl 2-nitrobutyl sulfide in good yield.

*Example VI*

The preparation of 2-nitrobutyl t-butyl sulfide was carried out as follows: To a mixture of 50 parts by weight of 2-nitro-1-butene with 45 parts by weight of 2-methyl-2-propanethiol was added one part by weight of triethylamine. The reaction was rapid, and external cooling was necessary to prevent the temperature from rising above 45° C. On fractional distillation of the reaction product, 52 parts by weight of the desired compound were obtained, boiling between 89 and 93° C. at about 3 mm. Hg, and having a specific gravity ($d_4^{25}$) of 1.007 and an index of refraction ($n_D^{25}$) of 1.469.

*Example VII*

The preparation of butyl 4-nitro-3-hexane sulfide was carried out by the following procedure: To a mixture of 250 parts by weight of 1-butanethiol and 7 parts by weight of triethylamine were added 129 parts by weight of 3-nitro-3-hexene. The temperature began gradually to rise as soon as the reactants had been mixed; so external cooling by means of a water bath was used to hold the reaction mixture around room temperature. After the reaction had been completed, the reaction product was distilled and a fraction measuring 195 parts by weight was obtained between 87 and 94° C. at a pressure between 1 and 2 mm. Hg, representing an 89% yield of the desired product, based on the nitroolefin. After an additional purification by fractional distillation, the product boiled at 93° C. at approximately 2 mm. Hg, and had a specific gravity ($d_4^{25}$) of 0.988 and an index of refraction ($n_D^{25}$) of 1.470. Analysis: calculated for $C_{10}H_{21}O_2NS$: 54.77% carbon, 9.65% hydrogen, 61.97 molecular refraction; found: 54.97% carbon, 9.49% hydrogen, 61.95 molecular refraction.

*Example VIII*

2-methyl-2-propanethiol reacts slowly with 3-nitro-3-heptene in the presence of triethylamine to form 3-nitro-4-heptane t-butyl sulfide, as illustrated in the following experiment:

To a mixture of 511 parts by weight of 3-nitro-3-heptene and 220 parts by weight of 2-methyl-2-propanethiol were added 15 parts by weight of triethylamine, and the mixture was allowed to stand. The odor of nitroolefin was still apparent after 18 hours at room temperature, but at the end of one week it had disappeared. The reaction product was distilled under vacuum and about 65 parts by weight of the desired compound were obtained. After redistillation, the product was found to have a boiling point of 75 to 76° C. at 0.3 mm. Hg, a specific gravity ($d_4^{25}$) of 0.9976, and an index of refraction ($n_D^{25}$) of 1.473. Analysis: calculated for $C_{11}H_{23}O_2NS$: 56.58% carbon, 9.93% hydrogen, 66.6 molecular refraction; found: 56.56, 56.79% carbon, 9.84, 10.00% hydrogen, 66.6 molecular refraction.

*Example IX*

The preparation of benzyl 2-nitro-1-phenylethyl sulfide was carried out according to the following procedure: To a mixture of 248 parts by weight of phenylmethanethiol and 298 parts by weight of 2-nitro-1-phenylethene were added 11 parts by weight of triethylamine. A vigorous reaction took place, and the reaction mixture was cooled by means of a water bath. After the reaction had ceased, the reaction product was crystallized from methanol, and 80 parts by weight of white crystals were obtained in the first crop. After recrystallization from ethanol, the product melted at 39° C. and analyzed as follows: Calculated for $C_{15}H_{15}O_2NS$: 65.91% carbon, 5.53% hydrogen; found: 66.00, 66.05% carbon, 5.50, 5.44% hydrogen.

*Example X*

The preparation of beta-naphthyl 2-nitro-1-phenylethyl sulfide was carried out as follows: To a solution of 320 parts by weight of 2-naphthalenethiol and 298 parts by weight of 2-nitro-1-phenylethene in 714 parts by weight of anhydrous ethyl ether were added 3.5 parts by weight of triethylamine. The expected product separated from the solution as a white solid in almost theoretical yield. It was recrystallized by dissolving in chloroform, adding isopropyl alcohol, boiling off the chloroform, cooling, allowing to crystallize, filtering, and drying. The recrystallized product melted at 114 to 115° C. and analyzed as follows: calculated for $C_{18}H_{15}O_2NS$: 69.88% carbon, 4.89% hydrogen; found: 69.61% carbon, 4.75% hydrogen.

While the above examples illustrate the preferred forms of my invention, it will be understood that departures may be made therefrom within the scope of the description and claims. In general it may be said that any modifications or equivalents that would ordinarily occur to those skilled in the art are to be considered as lying within the scope of my invention.

The products of my invention are useful in numerous applications. For example, they may be used as additives for lubricants and in insecticides. They are particularly useful as intermediates in the preparation of other compounds, such as amino thioethers, by reduction of the nitro groups, which are useful as corrosion inhibitors, as rubber vulcanization accelerators, and as intermediates in the synthesis of pharmaceuticals. The class of compounds that may be designated bis(omega-aminoalkyl) sulfides are particularly valuable for the synthesis of nylon-type polymers. Other uses will be obvious to those skilled in the art.

In accordance with the foregoing specification, I claim as my invention:

1. A process for the production of beta-nitroalkyl sulfides which comprises reacting at a temperature not substantially exceeding 100° C. a nitroolefin having the formula

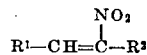

in which $R^1$ is a member selected from the group consisting of hydrogen, alkyl and aryl, and $R^2$ is a member selected from the group consisting of hydrogen and alkyl, with a sulfhydryl compound having the formula

in which $R^3$ is a member selected from the group consisting of hydrogen, alkyl, aryl, and aralkyl.

2. A process for the production of beta-nitroalkyl sulfides which comprises reacting at a temperature not substantially exceeding 100° C. a nitroolefin having the formula $$R^1-CH=C(NO_2)-R^2$$

in which $R^1$ is a member selected from the group consisting of hydrogen, alkyl and aryl, and $R^2$ is a member selected from the group consisting of hydrogen and alkyl, with a sulfhydryl compound having the formula $$R^3-SH$$

in which $R^3$ is a member selected from the group consisting of hydrogen, alkyl, aryl, and aralkyl, in the presence of an alkaline catalyst.

3. The process of claim 2 in which the reaction is carried out in the presence of an inert solvent.

4. The process of claim 2 in which the reaction is carried out at a temperature between about 0° C. and 100° C.

5. The process of claim 2 in which the alkaline catalyst is an amine having a dissociation constant between about $10^{-3}$ and $10^{-5}$.

6. A process for the production of beta-nitroalkyl sulfides which comprises mixing at a temperature ranging from about 0° to 100 C. a nitroolefin having the formula $$R^1-CH=C(NO_2)-R^2$$

in which $R^1$ is a member selected from the group consisting of hydrogen, alkyl and aryl, and $R^2$ is a member selected from the group consisting of hydrogen and alkyl, with a sulfhydryl compound having the formula $$R^3-SH$$

in which $R^3$ is a member selected from the group consisting of hydrogen, alkyl, aryl, and aralkyl, adding thereto a small proportion of triethylamine, agitating and cooling, and separating a beta-nitroalkyl sulfide therefrom.

7. A process for preparing symmetrical beta-nitroalkyl sulfides which comprises adding at a temperature not substantially exceeding 100° C. hydrogen sulfide to a nitroolefin having the formula $$R^1-CH=C(NO_2)-R^2$$

in which $R^1$ is a member selected from the group consisting of hydrogen, alkyl and aryl, and $R^2$ is a member selected from the group consisting of hydrogen and alkyl, in the presence of a small proportion of an amine having a dissociation constant between about $10^{-3}$ and $10^{-5}$, and separating a bis(beta-nitroalkyl) sulfide therefrom.

8. A process for preparing bis(2-nitrobutyl) sulfide which comprises passing hydrogen sulfide into 2-nitro-1-butene containing a small proportion of triethylamine at a temperature not substantially exceeding 100° C.

9. A process for preparing bis(1-nitro-2-butane) sulfide which comprises passing hydrogen sulfide into 1-nitro-1-butene containing a small proportion of triethylamine at a temperature not substantially exceeding 100° C.

10. A process for preparing bis(2-nitro-1-phenylethyl) sulfide which comprises passing hydrogen sulfide into 2-nitro-1-phenylethene containing a small proportion of triethylamine at a temperature not subtantially exceeding 100° C.

11. Bis(2-nitroalkyl) sulfides having the formula $$\begin{array}{c} R^1-CH-CH(NO_2)-R^2 \\ | \\ S \\ | \\ R^1-CH-CH(NO_2)-R^2 \end{array}$$

in which $R^1$ is a member selected from the group consisting of hydrogen, alkyl and aryl, and $R^2$ is a member selected from the group consisting of hydrogen and alkyl.

12. Bis(2-nitrobutyl) sulfide.
13. Bis(1-nitro-2-butane) sulfide.
14. Bis(2-nitro-1-phenylethyl) sulfide.
15. Beta-nitroalkyl sulfides having the general formula:

$$R^1-CH(NO_2)-CH(SX)-R^2$$

wherein X represents a substituent selected from a class consisting of hydrogen, alkyl, aryl, aralkyl and $$-CH(R^1)-CH(NO_2)-R^2$$

$R^1$ represents a substituent selected from the class consisting of hydrogen, alkyl and aryl and $R^2$ represents a substituent selected from a class consisting of hydrogen and alkyl.

16. A process for producing a nitroalkylthioether which comprises reacting a nitroolefin having the formula $$R'-CH=C(NO_2)-R^2$$

in which $R'$ is a member selected from the group consisting of hydrogen, alkyl and aryl and $R^2$ is a member selected from the group consisting of hydrogen and alkyl with a sulfhydryl compound having the formula $R^3$—SH in which $R^3$ is a member selected from the group consisting of alkyl, aryl and aralkyl in the presence of an alkaline catalyst.

CARL T. BAHNER.

REFERENCES CITED

The following references are of record in the file of this patent:

UNITED STATES PATENTS

| Number | Name | Date |
|---|---|---|
| 1,422,869 | Kranzlein et al. | July 18, 1922 |
| 1,570,262 | Kranzlein et al. | Jan. 19, 1926 |
| 2,163,176 | Keyssner | June 20, 1939 |
| 2,282,710 | Dietrich | May 12, 1942 |
| 2,390,099 | Harmon | Dec. 4, 1945 |